United States Patent [19]

Heismann

[11] 4,344,274

[45] Aug. 17, 1982

[54] GRASS CATCHER BAG

[75] Inventor: Richard A. Heismann, Knoxville, Ill.

[73] Assignee: Outboard Marine Corporation, Waukegan, Ill.

[21] Appl. No.: 197,484

[22] Filed: Oct. 16, 1980

[51] Int. Cl.³ .............................................. B65D 33/16
[52] U.S. Cl. .......................................... 56/202; 150/4
[58] Field of Search .................... 56/202, 16.6; 150/4, 150/5, 6, 2, 11, 15, 17, 18

[56] References Cited

U.S. PATENT DOCUMENTS

| | | | |
|---|---|---|---|
| 245,646 | 8/1881 | Martel | 150/17 |
| 506,515 | 10/1893 | Fever | 150/18 |
| 558,826 | 4/1896 | Middaugh | 150/17 |
| 1,787,710 | 1/1931 | Wilson | 150/5 |
| 2,863,365 | 12/1958 | Piazze | 150/11 |
| 3,230,696 | 1/1966 | Liljenberg | 56/202 |
| 4,175,603 | 11/1979 | Iaboni et al. | 56/202 |
| 4,258,538 | 3/1981 | Morse | 56/202 |

FOREIGN PATENT DOCUMENTS

| | | | |
|---|---|---|---|
| 84837 | 7/1921 | Fed. Rep. of Germany | 150/5 |
| 923615 | 7/1947 | France | 150/4 |

Primary Examiner—Gene Mancene
Assistant Examiner—John J. Wilson
Attorney, Agent, or Firm—Michael, Best & Friedrich

[57] ABSTRACT

A grass collection bag which can be removably supported on a lawn mower comprises a main body portion having a first access opening which can be connected to the grass discharge outlet of the lawn mower and a second access opening which serves as an outlet through which accumulated grass clippings can be dumped from the bag. Foldable first and second end panels are joined along one edge to each other and attached to the main body portion of the bag adjacent to the second access opening. A cord member is connected to each of the end panels. The cord members are joined to effect simultaneous folding of each end panel upon itself and back along the main body portion of the bag to bring the junction of the end panels into a position overlying and closing the second access opening.

10 Claims, 9 Drawing Figures

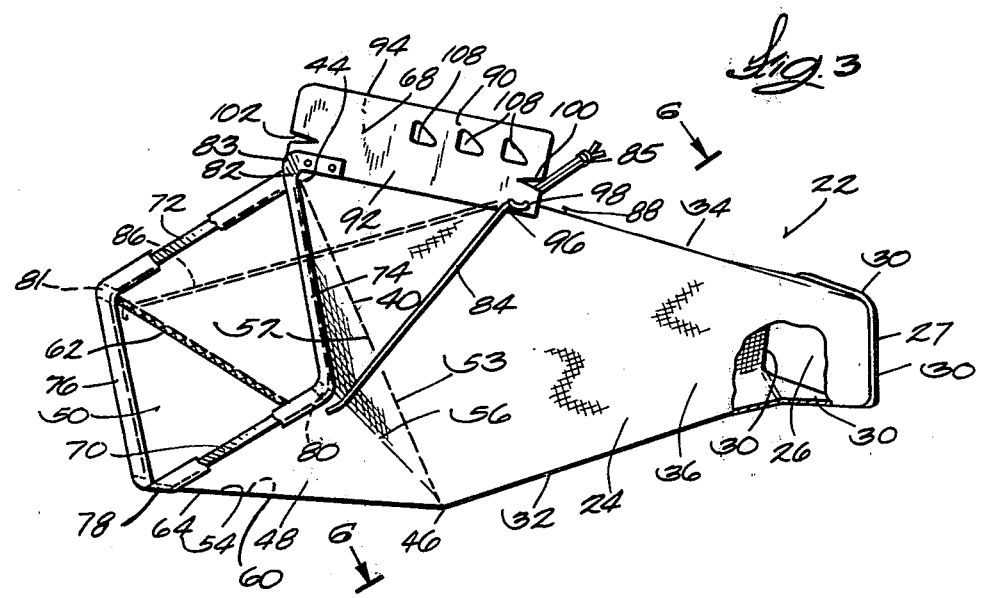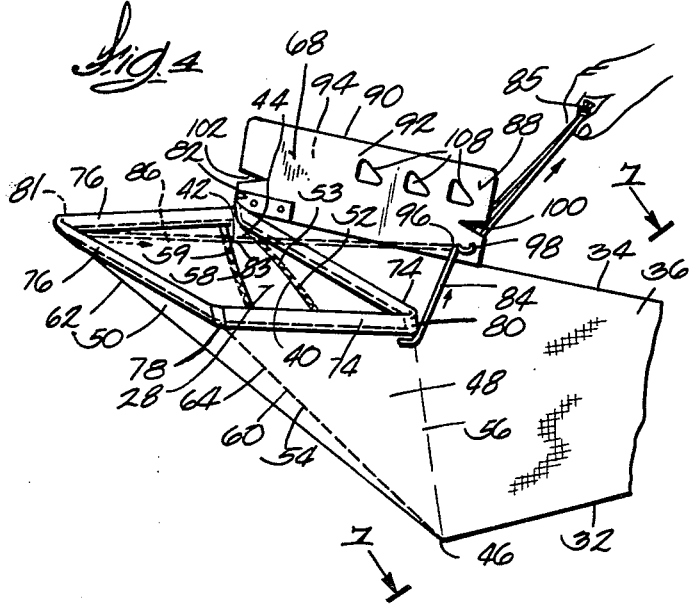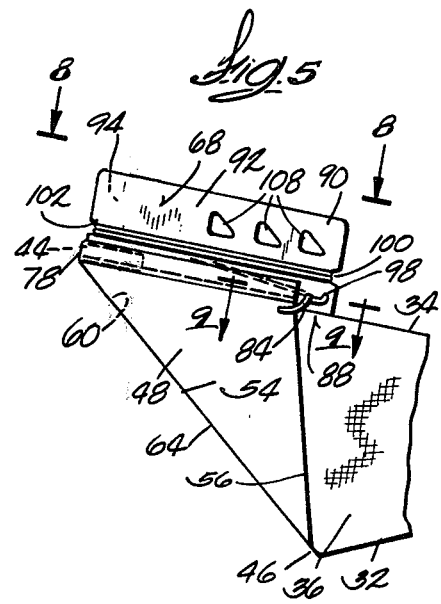

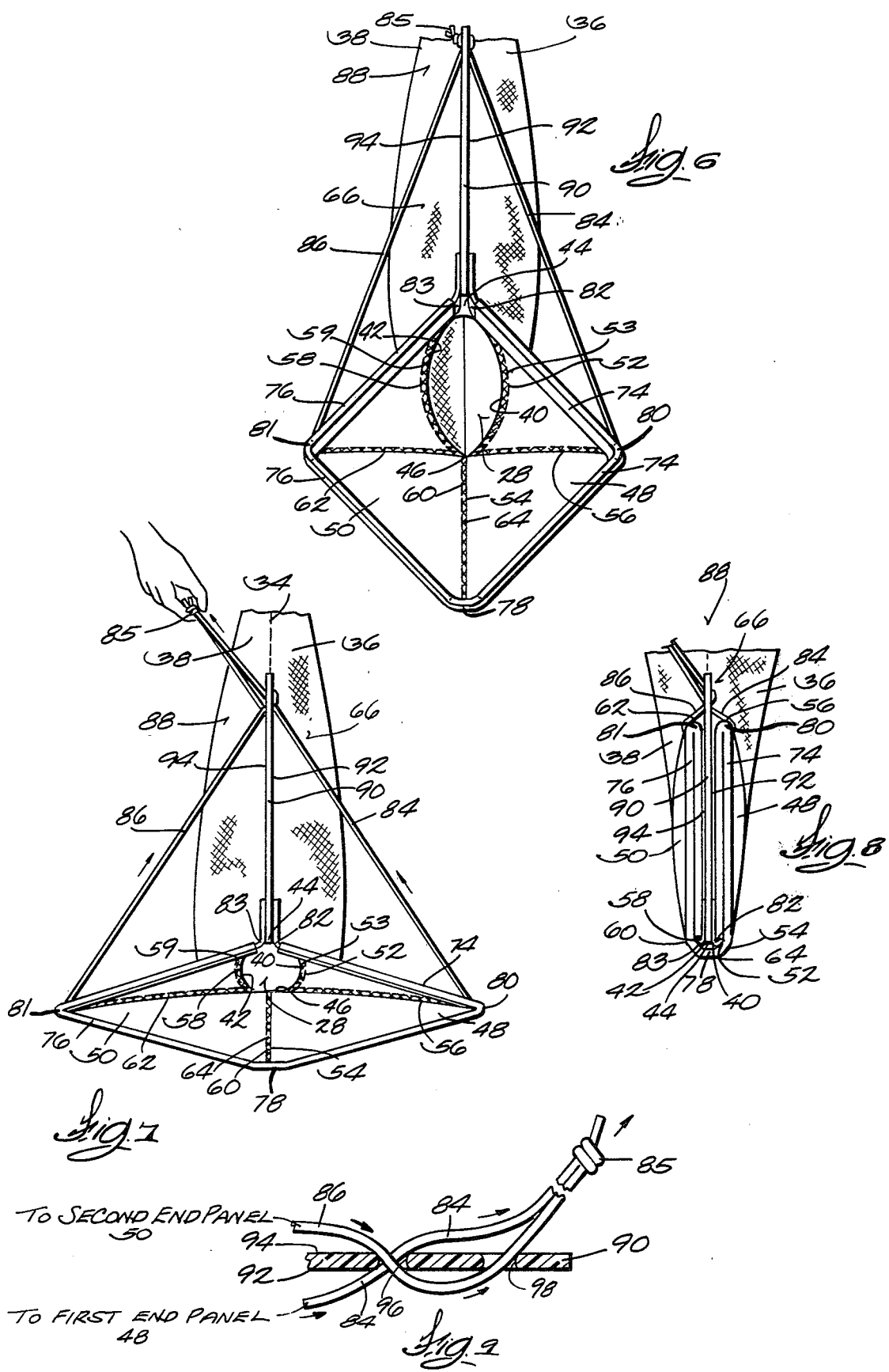

GRASS CATCHER BAG

FIELD OF THE INVENTION

The invention generally relates to bag construction, and more particularly, to a bag which can be used to collect the grass clippings discharged from a rotary powered lawn mower.

DESCRIPTION OF PRIOR ART

Attention is directed to the following United States Patents which disclose various bag constructions, all of which are closable by means of various "draw string" closure assemblies:

Cussen U.S. Pat. No. 184,595 Nov. 21, 1876
Gardner U.S. Pat. No. 217,362 July 8, 1879
Blumel U.S. Pat. No. 1,095,790 May 5, 1914
Holland U.S. Pat. No. 2,447,940 Aug. 24, 1948
Piazze U.S. Pat. No. 2,863,365 Dec. 9, 1958
Leader, U.S. Pat. No. 3,047,998 Aug. 7, 1962 et al.
Leader, U.S. Pat. No. 3,165,877 Jan. 19, 1965 et al.

Attention is also directed to Application Ser. No. 039,498 filed May 10, 1979, U.S. Pat. No. 4,258,538, Mar. 31, 1981, and entitled "Grass Catcher Bag". This Appication is assigned to the assignee of the present invention.

SUMMARY OF THE INVENTION

The invention provides a grass collection bag comprising a main body portion having a first access opening which is adapted for connection to a grass discharge outlet of a lawn mower. The main body portion has means defining a generally elongated second access opening having a pair of adjacently spaced first and second side edges having opposite ends. Foldable first and second end panels are connected to the main body portion adjacent to the second access opening and serve to close this access opening. More particularly, the first end panel has a first edge portion and a second edge portion. The first edge portion is connected to the main body portion adjacent to the first side edge, and the second edge portion extends outwardly from the main body portion adjacent to one of the ends of the first and second side edges. The first end panel is foldable upon itself to bring its second edge portion into a position overlying its first edge portion. The second end panel also includes a first edge portion and a second edge portion. The first edge portion of the second end panel is connected to the main body portion adjacent to the second side edge, and the second edge portion extends outwardly from the main body portion adjacent to the one end of the first and second side edges. Like the first end panel, the second end panel is foldable upon itself to bring its second edge portion into a position overlying its first edge portion. The second edge portions of the first and second end panels are joined together, and closure means is provided on the main body portion, the first end panel, and the second end panel for simultaneously folding each of the first and second end panels upon itself to bring the junction of the second edge portions of the first and second end panels into a position overlying and closing the second access opening.

In one embodiment, the bag further includes means operatively connected with the closure means for simultaneously securing the first and second end panels in their folded positions adjacent to the main body portion of the bag with the junction of the second edge portions in the overlying position with the second access opening.

In one embodiment, the first end panel and the second end panel each includes a third edge portion which extends outwardly from the main body portion adjacent to the end of the first and second edges opposite to the one end thereof. In this embodiment, the closure means include rib members attached to the third edge portions of each of the first and second end panels for reinforcing each of these third edge portions and for causing each of the first and second end panels to fold upon itself outwardly away from the second access opening.

In one embodiment, the closure means includes first cord means which is operatively connected with the first end panel for moving the first end panel from a generally unfolded position to a generally folded position in response to movement of the first cord means along the first end panel and toward the main body portion of the bag. Likewise, second cord means is provided which is operatively connected with the second end panel for moving the second end panel from a generally unfolded position to a generally folded position in response to movement of the second cord means along the second end panel and toward the main body portion. In this embodiment, means on the main body portion operatively joins the first cord means and the second cord means together for affecting simultaneous movement of both of the first and second cord means along their respective first and second end panels in response to movement of the junction of the first and second cord means along the main body portion. Uniform, simultaneous folding of the first and second panels is thus accomplished.

In one embodiment, the bag is removably mounted on the chassis of a lawn mower having a grass discharge outlet with the first access opening communicating with the grass discharge outlet.

One of the principal features of the invention is the provision of a grass collection bag which may be closed and sealed without the need of a zipper or the like and which lends itself to easy emptying.

Other features and advantages of the embodiments of the invention will become apparent upon reviewing the following general description, the drawings, and the claims.

DESCRIPTION OF THE DRAWINGS

FIG. 3 is a side perspective view, with sections broken away, of the grass collection bag shown in FIG. 1 with each of the end panels in its unfolded position;

FIG. 4 is a side perspective view of a portion of the grass collection bag shown in FIG. 3, except that the end panels are each shown in its partially folded position;

FIG. 5 is a side view of a portion of the grass collection bag shown in FIG. 3, except that the end panels are each shown in a folded and secured position, collectively closing the second access opening;

FIG. 6 is a downwardly-looking view of the grass collection bag taken generally along line 6—6 in FIG. 3;

FIG. 7 is a downwardly-looking view of the grass collection bag taken generally along line 7—7 in FIG. 4;

FIG. 8 is a downwardly-looking view of the grass collection bag taken generally along line 8—8 in FIG. 5; and FIG. 9 is an exploded view of a portion of the grass catcher bag closure assembly taken generally along line 9—9 in FIG. 5.

Figure 1:
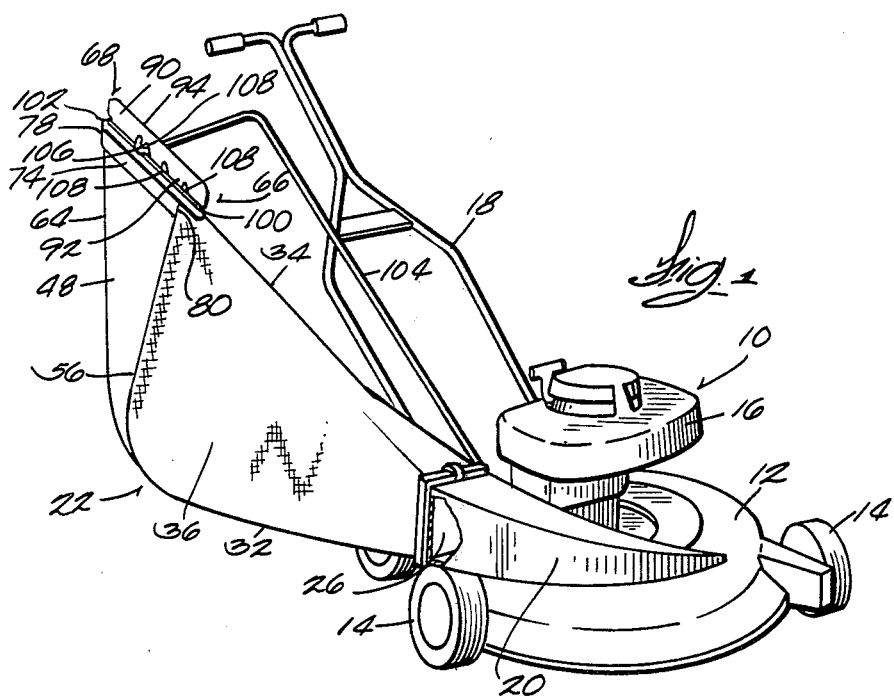
FIG. 1 is a perspective view of a rotary lawn mower, with a portion broken away, upon which a grass collection bag embodying various of the features of the invention is attached.

Before explaining the embodiments of the invention in detail, it is to be understood that the invention is not limited in its application to the details of construction and the arrangement of components set forth in the following description or illustrated in the drawings. The invention is capable of other embodiments and of being practiced and carried out in various ways. Also, it is to be understood that the phraseology and terminology being employed herein is for the purpose of description and should not be regarded as limiting.

GENERAL DESCRIPTION

Shown in FIG. 1 is a lawn mower 10 which includes a chassis 12 which houses a rotary cutting blade assembly (not shown) and which is supported by wheels 14 for movement over the ground. An engine 16 is mounted on the chassis 12 and drives the cutting blade assembly. A handle 18 is attached to one end of the chassis 12 for guiding lawn mower movement over the ground.

A grass discharge chute 20 extends from the chassis 12. As the cutting blade rotates, grass clippings are discharged through the chute 20. The chute 20 empties into a grass collection bag 22 which is removably mounted on the chassis 12 and into which the grass clippings are deposited.

Figure 2:
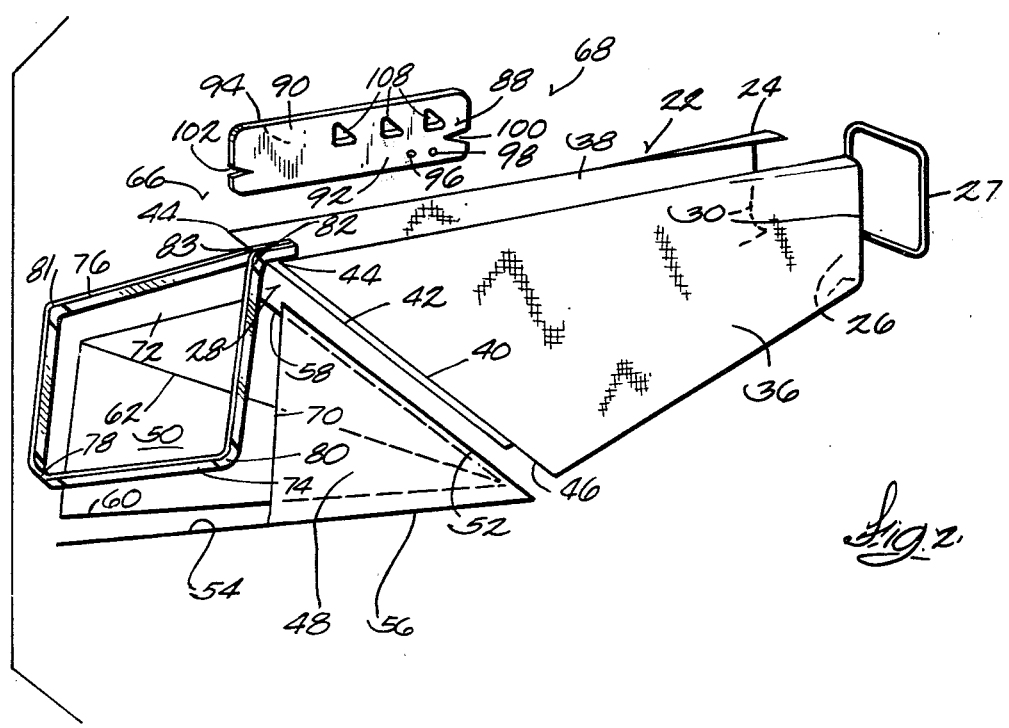
FIG. 2 is an exploded view of the grass catcher bag shown in FIG. 1.

Referring now principally to FIGS. 2 through 8, the bag 22 includes a main body portion 24 which, in the illustrated embodiment, is made of a cloth material. First and second openings, respectively 26 and 28, provide access into the interior of the main body portion 24. The first access opening 26 (which is best shown in FIGS. 2 and 3) can be suitably attached (see FIG. 1) to the grass discharge chute 20 to direct the discharge of grass clippings into the bag 22. The second access opening 28 (which is best shown in FIGS. 2, 4, 6 and 7) serves as an outlet through which the lawn mower operator can empty the accumulated grass clippings from the bag 22.

As can be best seen in FIG. 2, in the illustrated construction, wire stiffening 27 or the like forms four edges 30 which collectively define the periphery of the first access opening 26 (see also FIG. 3). First and second seams 32 and 34 (as best shown in FIG. 3) extend from two diametrically spaced peripheral edges 30 of the first access opening 26 and along the entire length of the main body portion 24 of the bag 22. These seams 32 and 34 form in the main body portion 24 of the bag 22 first and second side panels 36 and 38 (see FIGS. 2, 6, and 7). As best shown in FIG. 2, the side panels 36 and 38 terminate in adjacently spaced edges 40 and 42 with commonly joined opposite ends 44 and 46. These edges 40 and 42 form the periphery of the second access opening 28, which has a generally elongated shape (see FIGS. 2, 4 and 6). For the sake of clarity and description, end 44 will hereafter be referred to as the top end of the second access opening 28, and the opposite end 46 will accordingly be referred to as the bottom end.

Referring now principally to FIGS. 2 and 3, first and second end panels 48 and 50, which, in the illustrated embodiment, are also made of a cloth material, extend outwardly from the second access opening 28. The first end panel 48 has a first edge portion 52 (see FIG. 2) which is joined along the seam 53 (see FIG. 3) to the first side panel 36 adjacent to its edge 40, and a second edge portion 54 (see FIG. 2) which extends outwardly from the first side panel 36 adjacent to the bottom end 46 of the second access opening 28.

By virtue of this construction, the first end panel 48 is foldable upon itself (see in particular FIGS. 7 and 8) to bring its second edge portion 54 into a position overlying its first edge portion 52. The first end panel 48 is also foldable (see FIGS. 5 and 8) relative to the first side panel 36 about the seam 53 to locate the first edge portion 52 in overlying adjacent relationship to the first side panel 36 when the edge portions 52 and 54 are in their overlying relationshp with each other. To facilitate this folding action, a seam 56 extends from the bottom end 46 of the second access opening 28 diagonally across the first end panel 48 to define a fold line in the first end panel 48.

In like fashion (and referring principally to FIGS. 2 and 6 through 8), the second end panel 50 has a first edge portion 58 which is sewn along the seam 59 to the second side panel 38 adjacent to its edge 42, as well as a second edge portion 60 which extends outwardly from the second side panel 38 adjacent to the bottom end 46 of the second access opening 28. Like the first end panel 48, the second end panel 50 is foldable upon itself to bring its second edge portion 60 into a position overlying its first edge portion 58. The second end panel 50 is also foldable relative to the second side panel 38 about the seam 59 to locate its first edge portion 58 in overlying adjacent relationship to the second side panel 38. A diagonally extending seam 62 defines a fold line to facilitate this folding action.

The second edge portions 54 and 60 of the first and second end panels 48 and 50 are sewn together along seam 64. As can be seen in FIGS. 3 through 8, closure means 66 on the main body portion 24 of the bag 22 and the first and second end panels 48 and 50 is operative for simultaneously folding each of the first and second end panels 48 and 50 relative to its adjacent side panel 36 and 38 and upon itself to bring the junction of the second edge portions 54 and 60 (i.e. seam 64) into a position closing the second access opening 28 (see FIGS. 5 and 8). When so closed, the escape of grass clippings from the bag 22 through the second access opening 28 is prevented.

Means 68 is also provided for simultaneously securing the first and second end panels 48 and 50 in the position closing the second access opening 28. The second access opening 28 is thereby positively secured against loss of grass clippings.

To facilitate the simultaneous folding of the first and second end panels 48 and 50 to close the second access opening 28 (as shown in FIGS. 5 and 8), as well as to facilitate emptying of the bag 22 when the end panels 48 and 50 are in the position shown in FIGS. 3 and 6, the closure means 66 includes means on each of the first and second end panels 48 and 50 for causing each of the first and second end panels 48 and 50 to fold upon itself outwardly away from the second access opening 28.

While various constructions are possible, in the illustrated embodiment (as best seen in FIGS. 2 and 3), the first and second end panels 48 and 50 each include a third edge portion, respectively 70 and 72, which extends outwardly from the respective first and second side panels 48 and 50 adjacent to the top end 44 of the second access opening 28. Each third edge portion 70 and 72 intersects the junction 64 of the second edge portions 54 and 60 of the first and second end panels 48 and 50.

A first rib member 74, preferably plastic, extends generally coextensively along the third edge portion 70 of the first end panel 48 and serves to reinforce the third edge portion 70. Likewise, a second rib member 76, also preferably plastic, extends generally coextensively along the third edge portion 72 of the second end panel 50 for reinforcement purposes.

In this construction, a first hinge member 78 flexibly joins the first rib member 74 with the second rib member 76 across the junction 64 of the second end portions 54 and 60 of the first and second end panels 48 and 50. Likewise, second hinge members 80 and 81 are also located on, respectively, the first and second rib members 74 and 76 adjacent to the respective fold line seam 56 and 62. Lastly, third hinge members 82 and 83 flexibly join the first and second rib members 74 and 76 to the adjacent first and second side panels 38 and 40 adjacent to the top end 44 of the second access opening 28. These hinge members 78, 80, 81, 82 and 83 are preferably all plastic and serve to lend flexibility to the rib members 74 and 76 in the areas where folding of the end panels 48 and 50 occurs.

By virtue of this construction, the first and second end panels 48 and 50 are resiliently outwardly biased toward the generally unfolded position shown in FIGS. 3 and 6 to facilitate the dumping of accumulated grass clippings from the bag 22. Furthermore, and also by virtue of this construction, the first and second end panels 48 and 50 are caused to always fold upon themselves, as shown in FIGS. 4 and 7, outwardly of the second access opening 28 in response to operation of the closure means 66.

To affect simultaneous outward folding of the first and second end panels 48 and 50, the closure means 66 includes a first cord member 84 (see FIGS. 3, 4, 6 and 7). The cord member 84 is operatively connected with the first end panel 48 for moving the first end panel 48 from its generally unfolded position to its generally folded position in response to movement of the first cord member 84 along the first side panel 36 and away from the second access opening 28 in the direction of the main body portion 24. Likewise, the closure means 66 includes a second cord member 86 which is operatively connected with the second end panel 50 to move the second end panel 50 from its generally unfolded position to its generally folded position in response to movement of the second cord member 86 along the second side panel 38 and away from the second access opening 28 and also in the direction of the main body portion 24. Means 88 on the main body portion 24 near the top end 44 of the second access opening 28 operatively connects the first cord member 84 and the second cord member 86 together at junction 85 for affecting simultaneous movement of both of the first and second cord members 84 and 86 along the adjacent side panel 36 and 38 and away from the second access opening 28 in response to movement of the junction 85 of the first and second cord members 84 and 86 along the main body portion 24 of the bag 22.

More particularly, the means 88 includes a member 90, preferably plastic, which is sewn on the main body portion 24 along the seam 34. The member 90 includes a first side 92 extending along the first side panel 36 and a second side 94 extending along the second side panel 38. The member 90 further has first and second openings 96 and 98 progressively spaced away from the top end 44 of the second access opening 28.

In this construction, and referring principally to FIG. 9, the first cord member 84 extends along the second side 94 of the member 90, through the first opening 96, and is ultimately connected to the first end panel 48 adjacent to its associated fold line seam 56 near the hinge 80 (see FIG. 3). The second cord member 86 is joined with the first cord member 84 (the junction 85 being shown as a knot) adjacent to the second opening 98 and extends from its junction 85 with the first cord member 84, through the second opening 98 and along the first side 92 of the member 90, then back through the first opening 96 and crossing the first cord member 84 extending therethrough, and is ultimately connected to the second end panel 50 adjacent to its fold line seam 62 near the hinge 80 (see FIG. 3).

As can best be seen in FIG. 9, a looped arrangement is thus formed in the joined first and second cord members 84 and 86. And, as can be seen in FIGS. 4 and 7, movement of the knotted junction 85 of the cord members 84 and 86 away from the top end 44 of the second access opening 28 (shown by arrows in FIGS. 4, 7 and 9) affects uniform, simultaneous movement of each of the first and second cord members 84 and 86 along its respective side panel 36 and 38 (also shown by arrows) to simultaneously bring the first and second end panels 48 and 50 into their respective folded positions alongside the adjacent side panels 36 and 38 of the bag 22.

Furthermore, as can be seen in FIG. 6, the knotted junction 85 does not pass through opening 98 and serves to prevent movement of each of the first and second end panels 48 and 50 beyond the generally unfolded position shown in FIG. 6.

In this embodiment, and as best seen in FIGS. 5 through 7, the means 68 for securing the end panels 48 and 50 in their folded positions takes the form of a pair of notches 100 and 102, cut in the opposite ends of the member 90. By wrapping the joined first and second cord members 84 and 86 about the notches 100 and 102 (see FIGS. 1 and 8), the first and second end panels 48 and 50 are secured in their folded positions alongside the side panels 36 and 38 of the bag 22.

The second access opening 28 can be thus closed and sealed without the use of zippers or the like which may become jammed or corroded by the grass clippings accumulated in the bag 22.

As before mentioned, the grass collection bag 22 can be removably mounted on the lawn mower chassis 12. As is shown in FIG. 1, a support bar 104 extends generally outwardly of the handle 18 and includes a hooked end portion 106. The member 90 includes one or more openings 108 which engage the hooked end portion 106 of the support bar 104 to removably support the grass collection bag 22 on the lawn mower 10.

Various features of the invention are set forth in the following claims.

I claim:
1. A grass collection bag comprising an elongated main body portion having a first access opening adapted for connection to a grass discharge outlet of a lawn mower and means defining a generally elongated second access opening having a pair of adjacently spaced first and second side edges extending at an angle to the length of the bag and having corresponding first and second ends, a first end panel having a first edge portion connection along a first fold line to said first side edge of said main body portion and a second edge portion ex- tending outwardly from said main body portion and from adjacent to said first end of said first side edge, said first end panel being foldable upon itself along a second fold line extending from said first end of said first said edge to bring said second edge portion into a position overlying said first edge portion, a second end panel having a first edge portion connected along a third fold line to said second side edge of said main body portion and a second edge portion extending outwardly from said main body portion and from adjacent to said first end of said second side edge, said second end panel beiang foldable upon itself along a forth fold line extending from said first end of said second side edge to bring said second edge portion thereof into a position overlying said first edge portion thereof, means joining said second edge portions of said first and second end panels along a folding junction leaving an outer end remote from said first ends of said first and second side edges, and closure means on said main body portion, on said first end panel, and on said second end panel for folding each of said first and second end panels upon itself to bring said junction of said second edge portions of said first and second end panels into a position overlying and closing said second access opening and with said outer end of said junction located in adjacent relation to said second ends of said first and second side edges.

2. A lawn mower comprising a chassis including a grass discharge outlet, a grass collecting bag including an elongated main body portion having a first access opening adapted for connection to said grass discharge outlet, and means defining a generally elongated second access opening having a pair of adjacently spaced first and second side edges extending at an angle to the length of said bag and having corresponding first and second ends, a first end panel having a first edge portion connected along a first fold line to said first side edge of said main body portion and a second edge portion extending outwardly from said main body portion and from adjacent to said first end of said first side edge, said first end panel being foldable upon itself along a second fold line extending from said first end of said first side edge to bring said second edge portion into a position overlying said first edge portion, a second end panel having a first edge portion connected along a third fold line to said second side edge of said main body portion and a second edge portion extending outwardly from said main body portion and from adjacent to said fist end of said second side edge, said second end panel being foldable upon itself along a fourth fold line extending from said first end of said second side edge to bring said second edge portion thereof into a position overlying said first edge portion thereof, means joining said second edge portions of said first and second end panels along a folding junction having an outer end remote from said first ends of said first and second side edges, and closure means on said main body portion, on said first end panel, and on said second end panel for folding each of said first and second end panels upon itself to bring said junction of said second edge portions of said first and second end panels into a position overlying and closing said second access opening and with said outer end of said junction located in adjacent relation to said second ends of said first and second side edges, and mounting means attached to said chassis and to said main body portion for removably mounting said bag on said chassis with said first access opening attached to said grass discharge outlet.

3. A grass collection bag comprising a main body portion having a first access opening adapted for connection to a grass discharge outlet of a lawn mower and including first and second side panels forming adjacently spaced first and second side edges with opposite ends, said first and second side edges defining a second access opening, a first end panel having a first edge portion connected to said first side panel adjacent to said first side edge thereof and a second edge portion extending outwardly from said first side panel adjacent to one of said ends of said first and second side edges, said first end panel being foldable relative to said first side panel to locate said first edge portion in overlying adjacent relationship to said fist side panel and upon itself to bring said second edge portion into a position overlying said first edge portion, a second end panel having a first edge portion connected to said second side panel adjacent to said second side edge thereof and a second edge portion extending outwardly from said second side panel adjacent to said one end of said first and second side edges, said second end panel being foldable relative to said second side panel to locate said second edge portion in overlying adjacent relationship to said second side panel and upon itself to bring said second edge portion into a position overlying said first edge portion, means joining said second edge portions of said first and second end panels, and closure means on said main body portion, said first end panel, and said second end panel for folding each of said first and second end panels relative to said adjacent side panel and into overlying relation to said adjacent panel and upon itself to bring the junction of said second edge portions of said first and second end panels into a position closing said second access opening.

4. A lawn mower comprising a chassis including a grass discharge outlet, a grass collection bag including a main body portion having a first access opening adapted for connection to a grass discharge outlet of a lawn mower and including first and second side panels forming adjacently spaced first and second side edges with opposite ends, said first and second side edges defining a second access opening, a first end panel having a first edge portion connected to said first side panel adjacent to said first side edge thereof and a second edge portion extending outwardly from said first side panel adjacent to one of said ends of said first and second side edges, said first end panel being foldable relative to said first side panel to locate said first edge portion in overlying adjacent relationship to said first side panel and upon itself to bring said second edge portion into a position overlying said first edge portion, a second end panel having a first edge portion connected to said second side panel adjacent to said second side edge thereof and a second edge portion extending outwardly from said second side panel adjacent to said one end of said first and second side panel edges, said second end panel being foldable relative to said second side panel to locate said first edge portion in overlying adjacent relationship to said second side panel and upon itself to bring said second edge portion into a position overlying said first edge portion thereof, means joining said second edge portions of said first and second end panels, and closure means on said main body portion, said first end panel, and said second end panel for folding each of said first and second end panels relative to said adjacent side panel and into overlying relation to said adjacent panel and upon itself to bring the junction of said second edge portion of said first and second end panels into a position closing said second access opening, and mounting means attached to said chassis and to said main body portion for removably mounting said bag on said chassis with said first access opening attached to said grass discharge outlet.

5. A device according to claim 1 or 2 or 3 or 4 and further including means operatively connected with said closure means for simultaneously securing said first and second end panels in said position closing said second access opening.

6. A device according to claim 1 or 2 or 3 or 4 wherein said closure means includes means on each of said first and second end panels for causing each of said fist and second end panels to fold upon itself outwardly away from said second access opening.

7. A device according to claim 1 or 2 or 3 or 4 wherein said closure means includes first cord means operatively connected with said first end panel for moving said first end panel from a generally unfolded position to a generally folded position in response to movement of said first cord means along said first end panel and toward said main body portion, second cord means operatively connected with said second end panel for moving said second end panel from a generally unfolded position to a generally folded position in response to movement of said second cord means along said second end panel and toward said main body portion, and means on said main body portion operatively joining said first cord means and said second cord means for affecting simultaneous movement of both of said first and second cord means along the respective one of said first and second end panels and toward said main body portion in response to movement of the junction of said first and second cord means along said main body portion.

8. A device according to claim 1 or 2 or 3 or 4 wherein said first end panel and said second end panel each includes a third edge portion extending outwardly from said main body portion adjacent to the end of said first and second side edges opposite to said one end from which said second edge portion extends, and wherein said closure means includes rib means attached to said third edge portion of each of said first and second end panels for reinforcing each of said third edge portions and for causing each of said first and second end panels to fold upon itself outwardly away from said second access opening.

9. A device according to claim 1 or 2 or 3 or 4 wherein said closure means includes a member on said main body portion extending from the end of said first and second side edges opposite to said one end from which said second edge portion extends and including a first side adjacent to said first side edge and a second side adjacent to said second side edge, said member having first and second openings progressively spaced from said opposite end, a first cord member exending from adjacent to said second opening, along said second side of said member, through said first opening, and being connected to said first end panel, and a second cord member joined with said first cord member adjacent to said second opening and extending from said junction with said first cord member, through said second opening, along said first side of said member, and through said first opening, crossing said first cord member extending therethrough, and being connected to said second end panel.

10. A device according to claim 1 or 2 or 3 or 4, wherein said closure means is operable for simultaneously folding said first and second end panels.

* * * * *